United States Patent [19]
Loliger

[11] 3,909,014
[45] Sept. 30, 1975

[54] SEAL

[75] Inventor: Willi Loliger, Konolfingen, Switzerland

[73] Assignee: Societe d'Assistance Technique pour Produits Nestle S.A., Lausanne, Switzerland

[22] Filed: Oct. 16, 1973

[21] Appl. No.: 406,816

[30] Foreign Application Priority Data
Oct. 30, 1972 Switzerland.................. 15794/72

[52] U.S. Cl................ 277/72 R; 251/14; 137/241; 277/135
[51] Int. Cl.²..................... B65D 53/06; F16J 15/40
[58] Field of Search............ 277/72 R, 135, DIG. 1, 277/70, 72 FM, 71; 251/14; 137/241

[56] References Cited
UNITED STATES PATENTS

| | | | |
|---|---|---|---|
| 1,759,074 | 5/1930 | Van Rijswijk...................... | 277/135 |
| 2,573,425 | 10/1951 | Fletcher............................ | 277/72 R |
| 3,240,230 | 3/1966 | Callahan............................ | 251/214 |
| 3,661,505 | 5/1972 | Frolich.............................. | 137/241 |

Primary Examiner—Richard E. Aegerter
Assistant Examiner—L. Footland
Attorney, Agent, or Firm—Kenyon & Kenyon Reilly Carr & Chapin

[57] ABSTRACT

Seal for the passage of a movable part into a germ-free enclosure comprising a sleeve surrounding this movable part. Said sleeve is provided with a hot fluid circulation through an inlet, an outlet and a by-pass outlet. During normal running the inlet and by-pass outlet are open and the outlet closed.

4 Claims, 1 Drawing Figure

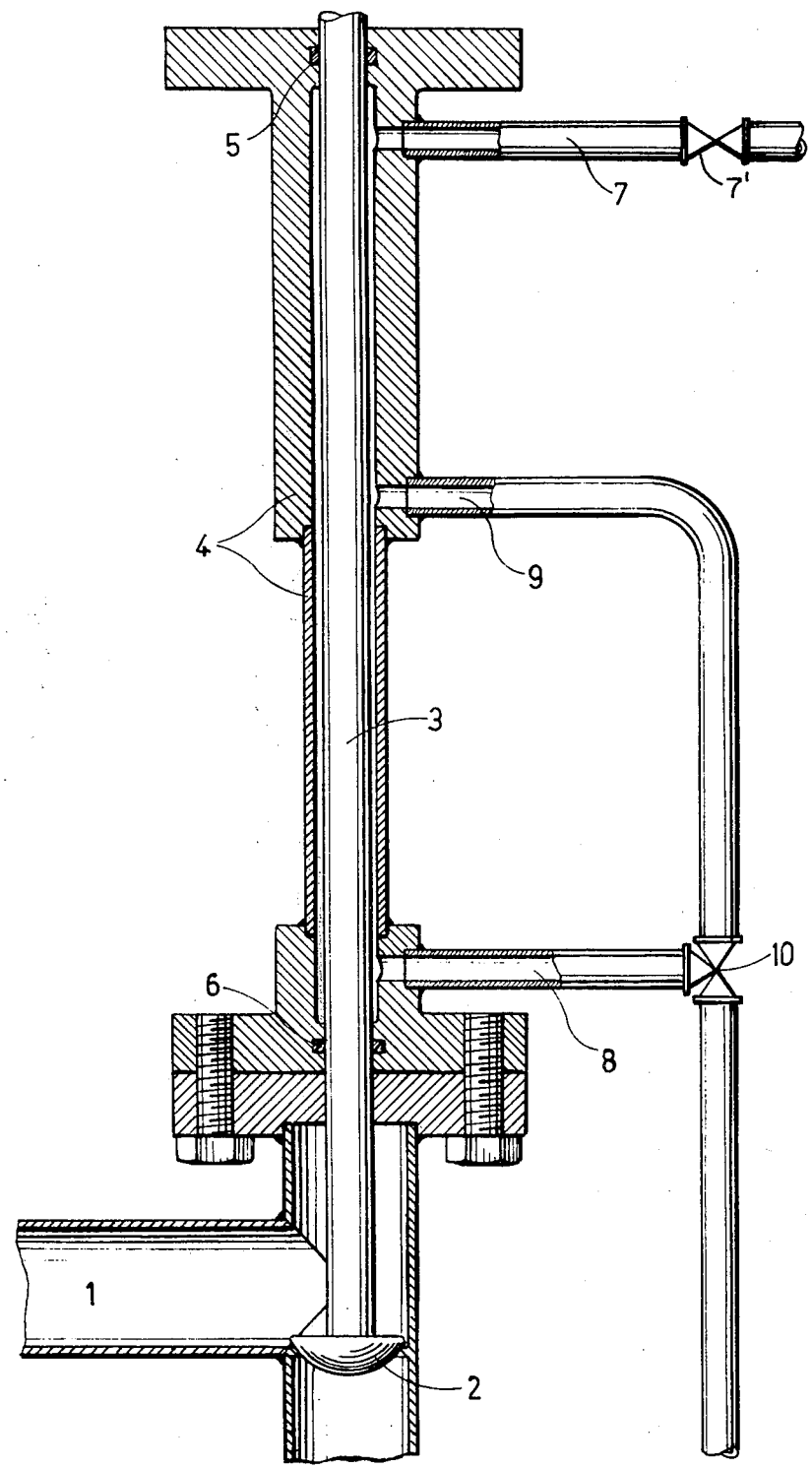

SEAL

This invention relates to a seal for the passage of a movable part into a germ-free enclosure, more particularly intended for an apparatus for the food industry.

In the apparatuses for the food industry, many devices are known to provide a bacteriological barrier at the point of entry of a movable part into a germ-free enclosure, e.g. the control rod of a valve into a pipe.

The bacteriological barrier can be for example a liquid disinfectant (hydrogen peroxyde, sodium hypochlorite, formaldehyde) but the danger is that the disinfectant may leak into the food, which is hardly an acceptable risk.

In some known devices, the bacteriological barrier is a zone which is first filled with steam at a relatively high temperature (120° to 150°C) during a preliminary sterilisation period, and then evacuated during normal running. Any movable part in this zone is therefore running dry and with the least entry of air, the bacteriological barrier disappears.

In the most simple devices, the bacteriological barrier is steam at a temperature of 120° to 150°C. However the steam heats the adjacent parts and when brought to a temperature of more than 100°C for example, these parts can damage the food with which they may be in contact.

With relatively simple means, the invention obviates the previously mentioned disadvantages.

The seal according to the invention comprises a sleeve being provided at its farthest end from said enclosure with a gaseous fluid inlet, at its nearest end from said enclosure with an outlet and between said inlet and said outlet with a by-pass outlet, said inlet, outlet and by-pass outlet each being provided with a valve, said by-pass outlet valve being open during normal running when said outlet valve is closed.

The annexed drawing shows, by way of example, an embodiment of the invention. The single FIGURE is a vertical section through a seal according to the invention.

In the drawing, a milk supply pipe 1 of a machine (not shown) comprises a valve 2 controlled by a rod 3 which can reciprocate vertically to open or close the pipe 1. This rod 3 is surrounded by a sleeve 4. Plastic packings 5 and 6 provide some air-tightness along the rod 3 i.e. the packings 5, 6 prevent the escape of gas or gaseous fluid from the ends of the sleeve 4. At the upper, farthest end from the pipe 1, the sleeve 4 is provided with a gaseous fluid inlet 7 connecting through a valve 7' the inside of the sleeve with a source (not shown) of steam at 120° to 150°C, preferably about 125°C.

At the lower, nearest end from the pipe 1, the sleeve 4 is provided with an outlet 8 and between the inlet 7 and the outlet 8 it is provided with a by-pass outlet 9. Both outlet 8 and by-pass outlet 9 are provided with a valve in the form of a common three-way valve 10 and the latter is connected through a diaphragm to a steam-trap (not shown).

Th operation is as follows:

At the start of the machine, the valve 7' is opened and the three-way valve 10 connects the outlet 8 and the by-pass outlet 9 to the steam-trap device. The steam at 125°C goes from the inlet 7 inside the sleeve to the outlet 8 and the by-pass outlet 9. At the same time, steam at 125°C is circulated inside the pipe 1.

After the time which is necessary to secure disinfection (approximately 15 minutes) the steam circulation is stopped inside the pipe 1 and the three-way valve is set to connect the by-pass outlet 9 with the steam-trap and to close the outlet 8. The steam at 125°C goes then from the inlet 7 to the by-pass outlet 9. Due to the distance between the steam circuit and the valve 2, the latter is then no longer heated. Local temperature measurements have shown that at the outlet 8, the temperature which was 125°C during the preliminary steam circulation drops to 30°C approximately when the outlet 8 is closed and the by-pass outlet 9 connected to the steam-trap. Milk, for example, which is particularly sensitive to heat, can flow through the pipe 1 without damage.

After a while, if the seal is placed in vertical position, as shown, condensed water progressively fills up the bottom of the sleeve, but this water is sterile. As soon as the level of the condensed water reaches the by-pass outlet 9, it is entrained by the steam flow. In any event, this water will be expelled from the sleeve through the outlet 8 at the next start of the machine.

The by-pass outlet 9 must be at an appropriate distance from the outlet 8. The greater the distance, the less will the heat be transmitted to the valve 2. This distance, however, has its practical limits. Experience has shown that the distance between the gaseous fluid inlet 7 and the by-pass outlet 9 and the distance between the by-pass outlet 9 and the outlet 8 must each be greater than the stroke of the rod 3. Moreover, the distance between the by-pass outlet 9 and the outlet 8 shall be preferably greater than 5 times the diameter of the rod 3.

I claim:

1. In combination with a reciprocable movable part, a seal for the passage of said reciprocable movable part into a germ-free enclosure, said seal comprising a sleeve surrounding said movable part, and seal means between said movable part and said sleeve for preventing escape of gas from the ends of said sleeve, said sleeve being provided at its farthest end from said enclosure with a gaseous fluid inlet, at its nearest end from said enclosure with an outlet and between said inlet and said outlet with a by-pass outlet, said inlet, outlet and by-pass outlet each being provided with a valve, said by-pass outlet valve being open during normal running when said outlet valve is closed and in which the distance between said gaseous fluid inlet and said by-pass outlet and the distance between said by-pass outlet and said outlet each is greater than the stroke of said movable part.

2. Seal according to claim 1, in which said outlet valve and said by-pass outlet valve are combined into a common three-way valve.

3. Seal according to claim 1, in which the movable part is cylindrical and in which the distance between said outlet and said by-pass outlet is greater than 5 times the diameter of said movable part.

4. In combination
   a valve having a vertical reciprocally mounted control rod,
   a sleeve surrounding said rod,
   a gaseous fluid inlet at an end of said sleeve farthest from said valve for introducing steam into said sleeve to selectively heat said valve,
   an outlet at an end of said sleeve nearest said valve for exhausting steam from said sleeve, a by-pass outlet in said sleeve between said inlet and said outlet for exhausting steam from said sleeve,
a valve in each of said inlet, outlet and by-pass outlet, and a packing at each end of said sleeve between said rod and said sleeve for preventing escape of gaseous fluid from the ends of said sleeve.

* * * * *